(12) United States Patent
Nakamura (10) Patent No.: US 8,184,895 B2
(45) Date of Patent: May 22, 2012

(54) METHOD AND APPARATUS FOR MAGNETIC CHARACTER RECOGNITION

(75) Inventor: Hiroshi Nakamura, Nagano (JP)

(73) Assignee: Nidec Sankyo Corporation (JP)

(*) Notice: Subject to any disclaimer, the term of this patent is extended or adjusted under 35 U.S.C. 154(b) by 1185 days.

(21) Appl. No.: 11/943,704

(22) Filed: Nov. 21, 2007

(65) Prior Publication Data

US 2008/0123933 A1 May 29, 2008

(30) Foreign Application Priority Data

Nov. 21, 2006 (JP) .................... 2006-314551

(51) Int. Cl.
*G06K 9/00* (2006.01)

(52) U.S. Cl. ............. 382/139; 702/66; 702/71; 345/94; 345/208; 358/484

(58) Field of Classification Search ............... None
See application file for complete search history.

(56) References Cited

U.S. PATENT DOCUMENTS

| | | | |
|---|---|---|---|
| 5,671,291 A | 9/1997 | Ruault et al. | |
| 6,621,920 B1* | 9/2003 | Koike | 382/139 |
| 6,906,821 B1* | 6/2005 | Hanazono et al. | 358/1.16 |
| 6,956,962 B1* | 10/2005 | Hayosh | 382/139 |
| 6,986,464 B2* | 1/2006 | Takiguchi et al. | 235/449 |
| 2005/0286752 A1* | 12/2005 | Takiguchi | 382/139 |
| 2006/0043182 A1* | 3/2006 | Kinoshita | 235/449 |
| 2009/0324106 A1* | 12/2009 | Nakamura | 382/224 |

FOREIGN PATENT DOCUMENTS

JP  9-311906  12/1997

* cited by examiner

*Primary Examiner* — John Lee
(74) *Attorney, Agent, or Firm* — Cantor Colburn LLP (57) ABSTRACT

A method for magnetic character recognition is disclosed. The method may include preparing a standard waveform that is used as a datum in an operation of reading magnetic ink characters, generating a regeneration waveform from a character string of the magnetic ink characters printed on a surface of an information recording medium, segmenting a character waveform of each of the magnetic ink characters from the regeneration waveform, comparing the character waveform segmented through the segmentation process with the standard waveform, and selecting a plurality of the standard waveforms of candidate characters in accordance with a comparison result of the comparison process. A read character may be identified with the candidate character that has the greatest value among all the coefficient values of coincidence.

9 Claims, 7 Drawing Sheets

| CANDIDATE CHARACTER | -3 | -2 | -1 | INITIAL POSITION 0 | +1 | +2 | +3 |
|---|---|---|---|---|---|---|---|
| 1 (T) | 0.560 | 0.615 | 0.660 | 0.685 | 0.676 | 0.634 | 0.560 |
| 2 (8) | 0.086 | 0.252 | 0.440 | 0.624 | 0.777 | 0.880 | 0.917 |
| 3 ($) | 0.159 | 0.283 | 0.396 | 0.484 | 0.536 | 0.550 | 0.524 |

| CANDIDATE CHARACTER | -3 | -2 | -1 | INITIAL POSITION 0 | +1 | +2 | +3 |
|---|---|---|---|---|---|---|---|
| 1 (T) | 0.569 | 0.578 | 0.562 | 0.527 | 0.478 | 0.419 | 0.356 |
| 2 (O) | 0.476 | 0.521 | 0.509 | 0.448 | 0.344 | 0.218 | 0.090 |
| 3 (U) | 0.407 | 0.470 | 0.482 | 0.444 | 0.358 | 0.242 | 0.115 |

Fig. 10 (b)

METHOD AND APPARATUS FOR MAGNETIC CHARACTER RECOGNITION

CROSS REFERENCE TO RELATED APPLICATION

The present invention claims priority under 35 U.S.C. §119 to Japanese Application No. 2006-314551 filed Nov. 21, 2006, the contents of which are incorporated herein by reference.

FIELD OF THE INVENTION

At least an embodiment of the present invention relates to a method and an apparatus for magnetic ink character recognition for reading a character string printed with magnetic ink characters and obtaining a magnetic regeneration signal for character recognition, and particularly to a method and an apparatus thereof that enables character recognition with high accuracy.

BACKGROUND OF THE INVENTION

Conventionally, there have been disclosed various methods in which a part of a medium surface, where magnetic ink characters (MICR characters) are printed, is read by using a magnetic head so as to obtain a magnetic regeneration signal for the purpose of character recognition. The magnetic ink characters (MICR characters) are used for checks and the like to be used in financial facilities. Character types thereof typically include E13B and CMC7, and the character types are standardized by ISO 1004 and so on.

At the initial stage in the history of development of the technology for recognizing MICR characters, a major method for character recognition involved reading a magnetic character line by using a magnetic head, inputting a waveform of the magnetic regeneration signal into a logical circuit, and then recognizing the character according to characteristics of a peak position and an output level in the waveform of the magnetic regeneration signal. However, in association with technical advancement of the performance of microprocessors as well as enhancement of memory units in relation with their high-speed operation and large capacity, character recognition by processing a magnetic signal with software has been increasing these years. Furthermore, examples of character recognition include some cases in which not only a magnetic signal but also an image captured by scanning a medium are used together.

In a disclosed method in which a magnetic signal is used, a waveform of a magnetic regeneration signal of a character is compared with a standard waveform prepared in advance for each character, as it is. Then, the character is identified according to its similarity in the comparison (For example, refer to Patent Document 1 and Patent Document 2).

Patent Document 1

U.S. Pat. No. 5,671,291

Patent Document 2

Japanese Unexamined Patent Publication (Kokai) No. JP9-311906

However, among checks and so on used practically in the marketplace, some include poorly printed magnetic ink characters even though the characters are still within an allowable range. Therefore, it is necessary for the technology of character recognition to be able to recognize those characters included in such a border range without any false character recognition.

To describe more in detail, magnetic ink characters being practically used include variations, depending on qualities of magnetic ink, a printing machine, and magnetic properties of a regeneration magnetic head and a magnetizing head. Eventually there arise alterations in the magnetic ink characters; such as a high magnetic force, a low magnetic force, a thick-lined character, a thin-lined character, tilt, and so on. Furthermore, depending on using condition and storage condition of a check, there may also arise other alterations in the characters, such as having an opening, an unclear character, and a blurring character, etc. As a result, those alterations in the magnetic ink characters deform the waveforms of the magnetic regeneration signals in various ways.

In the invention disclosed by Patent Document 1, it is assumed that absolute values of differences at all corresponding points between an objective recognition waveform and a standard waveform are within a predefined range. However, if there exists any such a problem of waveform deformation as described above, it becomes difficult to fulfill this assumed requirement and the problem may easily increase a rejection rate.

Furthermore, in the invention disclosed by Patent Document 2, an increase of a collation ratio is tried by a correction through expansion and contraction of the standard waveform in a case of a poor collation ratio between the waveforms. However, unfortunately an excessive level of waveform deformation makes the correction impossible. Still further, the expansion and contraction of the standard waveform causes a heavy operation load, and may result in production cost increase of the apparatus.

At least an embodiment of the present invention provides a method and an apparatus for magnetic ink character recognition for recognizing MICR characters with high accuracy, even when there exist variations in printing qualities and deformation of checks, and the like that result in a high level of waveform deformation.

SUMMARY OF THE INVENTION

To solve the problem identified above, at least an embodiment of the present invention provides the following aspects.

(1) A method for magnetic character recognition including: a standard waveform preparation process for preparing a standard waveform that is used as a datum in an operation of reading magnetic ink characters, printed with a magnetic ink, by using a magnetic head; a waveform generation process for generating a regeneration waveform from a character string of the magnetic ink characters printed on a surface of an information recording medium; a segmentation process for segmenting a character waveform of each of the magnetic ink characters from the regeneration waveform; a comparison process for comparing the character waveform segmented through the segmentation process with the standard waveform; a selection process for selecting a plurality of the standard waveforms of candidate characters in accordance with a comparison result of the comparison process; a shift process for shifting the standard waveforms of the candidate characters and the character waveform relatively in a generating direction of the regeneration waveform and its counter direction at predefined intervals; and an arithmetic operation process for calculating a coefficient of coincidence to indicate a degree of coincidence between the standard waveforms of the candidate characters and the character waveform at each shift position in the shift process; wherein, according to a calculation result of the arithmetic operation process, the read character is identified with the candidate character that has the greatest value among all the coefficient values of coincidence.

According to at least an embodiment of the present invention; the standard waveform preparation process prepares a standard waveform for each of the magnetic ink characters, the waveform generation process generates a regeneration waveform from a character string of the magnetic ink characters printed on an information recording medium, the segmentation process segments a character waveform of each character from the regeneration waveform, the comparison process compares the segmented character waveform with the standard waveform, the selection process selects a plurality of the standard waveforms of candidate characters, the shift process shifts the standard waveforms of the candidate characters and the segmented character waveform relatively in a generating direction of the regeneration waveform and its counter direction at predefined intervals, the arithmetic operation process calculates a coefficient of coincidence between the standard waveforms of the candidate characters and the segmented character waveform at each shift position; and in accordance with the calculation result, the read character is identified with the candidate character that has the greatest value among all the coefficient values of coincidence. Therefore, the magnetic character recognition can be carried out with high accuracy.

Namely, when the character waveform segmented by the segmentation process is compared with the standard waveform, displacement of the segmenting point may result in a lower coefficient of coincidence on a large scale even though the displacement is small, wherein such displacement may be caused in the segmentation process. Then, the standard waveforms and the character waveform are shifted back and forth relatively along the generating direction of the regeneration waveform in order to calculate a coefficient of coincidence at each position and adopt the greatest value among all the coefficient values of coincidence. Therefore, even when the coefficient of coincidence between the standard waveforms of the candidate characters and the character waveform is low in the initial comparison of the comparison process, the reading accuracy can be improved.

Furthermore, in the initial comparison of the comparison process, displacement of the segmenting point may cause a wrong candidate character to be provided with the greatest value among all the coefficient values of coincidence. In such a case, shifting the comparison position does not improve the coefficient values of coincidence in the shifting process so that the character recognition becomes impossible. To avoid such condition, a plurality of candidate characters, including a character having the highest coefficient of coincidence and its followers in the initial comparison, are selected in the selection process. Then, in relation to each candidate character, a coefficient of coincidence between each of the standard waveforms and the objective character waveform is calculated while the comparison position is shifted by degrees. After obtaining the highest coefficient of coincidence for each candidate character, the read character is identified with a candidate character that shows the greatest value among all the highest coefficient values of coincidence. Thus, a waveform comparison is made for the plurality of candidate characters at the same time. Therefore, even when a wrong candidate character is provided with the greatest value among all the coefficient values of coincidence in the initial comparison, there improves a chance of providing the right candidate character with the greatest value among all the coefficient values of coincidence in the end, and then the magnetic character recognition can be carried out with higher accuracy.

(2) The method for magnetic character recognition further including, an additional standard waveform preparation process having a preparation of at least one additional standard waveform; wherein the additional standard waveform has at least one standard waveform among standard waveforms of the candidate characters being thick-lined and thin-lined, and the candidate characters being tilted at the time of reading with the magnetic head.

According to at least an embodiment of the present invention; the method for magnetic character recognition further includes an additional standard waveform preparation process that prepares at least one additional standard waveform having at least one standard waveform among standard waveforms of the candidate characters being thick-lined and thin-lined, and the candidate characters being tilted. Therefore, when the magnetic character recognition described in item (1) above does not result in any expected coefficient of coincidence, comparisons are made with the additional standard waveforms in due order so that the magnetic character recognition can be carried out with higher accuracy even though the magnetic ink character has any deformation.

When the coefficient of coincidence between the segmented character waveform and the standard waveform is low, mostly the magnetic ink character printed on the information recording medium may be extremely thick-lined or thin-lined or be printed with tilt. For such a case, second and third waveforms are prepared as additional standard waveforms, including variations in thickness of the candidate characters and tilts of the characters. Then, if a comparison with the standard waveform does not result in any expected coefficient of coincidence, comparisons are made with the additional standard waveforms in order to enable improvement of the reading accuracy.

(3) The method for magnetic character recognition: wherein, if the coefficient of coincidence calculated by the arithmetic operation process is greater than a predefined coefficient of coincidence in the comparison process, the read character is identified with the candidate character that shows the greatest value among all the coefficient values of coincidence.

According to at least an embodiment of the present invention; when the coefficient of coincidence calculated by the arithmetic operation process is greater than a predefined coefficient of coincidence in the comparison process, the read character is identified with the candidate character that shows the greatest value among all the coefficient values of coincidence. Then, while avoiding any wrong character recognition, the character recognition can be realized with higher accuracy.

(4) The method for magnetic character recognition: wherein the predefined coefficient of coincidence is set to be 0.7.

According to at least an embodiment of the present invention; the predefined coefficient of coincidence is set to be 0.7, and no character recognition is carried out when the coefficient of coincidence is smaller than 0.7, and then while avoiding any wrong character recognition, the character recognition can be realized with higher accuracy.

(5) The method for magnetic character recognition: wherein at least 3 of the standard waveforms corresponding to the candidate characters having the highest coefficient of coincidence and its followers are selected in the comparison process.

According to at least an embodiment of the present invention; in the method for magnetic character recognition, at least 3 of the standard waveforms corresponding to the candidate characters having the highest coefficient of coincidence and its followers are selected in the comparison process. Therefore, even when a wrong candidate character shows the greatest value among all the coefficient values of coincidence in the initial comparison of the comparison process, a waveform comparison is made for also the right candidate character at the same time as far as the right candidate character shows a second or third great coefficient of confidence, and then the character recognition can be carried out with higher accuracy.

(6) The method for magnetic character recognition: wherein a shifting range in the shift process is 3 dots each in the generating direction of the regeneration waveform and its counter direction.

According to at least an embodiment of the present invention; a shifting range in the shift process is 3 dots each in the generating direction of the regeneration waveform and its counter direction. Therefore, high enough coefficient values can be obtained even if the segmenting point of the character waveform is displaced up to around 3 dots, and the character recognition can be carried out with high accuracy.

(7) An apparatus for magnetic character recognition including: a standard waveform storage section for storing a magnetic waveform of each of magnetic ink characters, printed with a magnetic ink, as a standard waveform; a magnetic head for reading a regeneration waveform from a character string including the magnetic ink characters; a regeneration waveform storage section for storing the regeneration waveform read by using the magnetic head; a character segmenting section for segmenting a character waveform, corresponding to each of the magnetic ink characters, from the regeneration waveform stored in the regeneration waveform storage section; and a character recognition section for comparing the standard waveform, stored in the standard waveform storage section, with the character waveform, segmented by the character segmenting section; and the character recognition section further comprising: candidate character selecting means for selecting a plurality of waveforms, as candidates, among the standard waveforms; calculating means for a calculation of a coefficient of coincidence to indicate a degree of coincidence between each of the standard waveforms of the candidate characters and the character waveform at each shift position, wherein the standard waveforms selected by the candidate character selecting means and the character waveform are relatively shifted in a generating direction of the regeneration waveform and its counter direction at predefined intervals; and determining means for a determination of the read character with the candidate character that has the greatest value among all the coefficient values of coincidence in accordance with a calculation result of the calculating means.

According to at least an embodiment of the present invention; the standard waveform storage section stores a magnetic waveform of each of magnetic ink characters as a standard waveform; the magnetic head reads a regeneration waveform from a character string including the magnetic ink characters; the regeneration waveform storage section stores the regeneration waveform read by using the magnetic head; the character segmenting section segments a character waveform, corresponding to each of the magnetic ink characters, from the regeneration waveform; the character recognition section compares the standard waveform, stored in the standard waveform storage section, with the character waveform, segmented by the character segmenting section; and in the character recognition section, the candidate character selecting means selects a plurality of waveforms, as candidates, among the standard waveforms; the calculating means calculates a coefficient of coincidence between each of the standard waveforms of the candidate characters and the character waveform at each shift position, wherein the selected standard waveforms and the character waveform are relatively shifted in a generating direction of the regeneration waveform and its counter direction; and the determining means determines the read character with the candidate character that has the greatest value among all the coefficient values of coincidence. Therefore, the magnetic character recognition can be carried out with high accuracy.

Namely, the standard waveforms and the character waveform are shifted back and forth relatively along the generating direction of the regeneration waveform in order to calculate a coefficient of coincidence at each position and adopt the greatest value among all the calculated coefficient values of coincidence. Therefore, even when the character segmenting point of the character segmenting section is displaced back or forth along the generating direction of the regeneration waveform so that the coefficient of coincidence between the standard waveforms and the character waveform is low in the initial comparison, the reading accuracy can be improved.

Furthermore, a waveform comparison is made for the plurality of candidate characters at the same time. Therefore, even when a wrong candidate character is provided with the greatest value among all the coefficient values of coincidence in the initial comparison, there improves a chance of providing the right candidate character with the greatest value among all the coefficient values of coincidence in the end, and then the magnetic character recognition can be carried out with higher accuracy.

(8) The apparatus for magnetic character recognition, further including a waveform generation section for generating a shaped waveform by removing noise from the regeneration waveform stored in the regeneration waveform storage section.

According to at least an embodiment of the present invention; the apparatus for magnetic character recognition, including the waveform generation section for generating a shaped waveform by removing noise from the regeneration waveform stored in the regeneration waveform storage section, enables a waveform comparison, being free from influence of noise. Therefore, the magnetic character recognition can be carried out with higher accuracy.

(9) The apparatus for magnetic character recognition, further including a peak detecting section for detecting peak information data out of the shaped waveform generated by the waveform generation section.

According to at least an embodiment of the present invention; the apparatus for magnetic character recognition, including the peak detecting section for detecting peak information data out of the shaped waveform generated by the waveform generation section, enables segmenting a character waveform out of the shaped waveform, from which noise has already been removed, in accordance with the peak information data. Therefore, the magnetic character recognition can be carried out with higher accuracy.

(10) The apparatus for magnetic character recognition, further including a character boundary detecting section for detecting a boundary of each of the magnetic ink characters in the regeneration waveform in accordance with the peak information data.

According to at least an embodiment of the present invention; the apparatus for magnetic character recognition, including the character boundary detecting section for detecting a boundary of each of the magnetic ink characters in the regeneration waveform in accordance with the peak information data, enables the magnetic character recognition with higher accuracy.

Namely, an important factor in the character recognition is how accurately a waveform corresponding to each character is segmented. A segmenting position of the character waveform is affected by the accuracy of detecting a forefront part of the character. The character boundary detecting section detects a boundary of each of the magnetic ink characters in accordance with the peak information data in order to improve the accuracy of detecting a forefront part of the character. As a result, the accuracy of the magnetic character recognition can be improved.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DESCRIPTION OF THE PREFERRED EMBODIMENTS

At least an embodiment of the present invention is described below with reference to the accompanying drawings.

Figure 1:
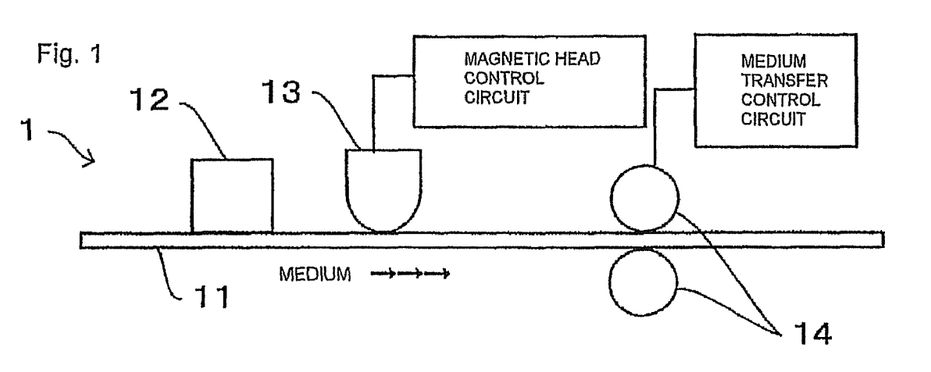
FIG. 1 is a schematic view of showing a structure of the magnetic character recognition apparatus 1 in accordance with at least an embodiment of the present invention.

FIG. 1 is a schematic view of showing a structure of a magnetic character recognition apparatus 1 in accordance with at least an embodiment of the present invention. In at least an embodiment of the present invention, a check reader provided with an MICR function is taken up for explanation. FIG. 1 illustrates a configuration of a section mainly relating to MICR processing of the magnetic character recognition apparatus 1 in accordance with at least an embodiment of the present invention.

In FIG. 1, the magnetic character recognition apparatus 1 includes a paper medium transfer path 11, a magnetizing head 12 for re-magnetizing MICR characters (i.e., magnetic ink characters printed by using magnetic ink), a magnetic head 13 for detecting magnetism of the MICR characters, and rollers 14 for transferring the paper medium. The magnetic head 13 and the rollers 14 are controlled by a magnetic head control circuit and a medium transfer control circuit, respectively.

Having been inserted into the paper medium transfer path 11, a check (i.e., an information data recording medium) is transferred by the rollers 14, and passes by the magnetizing head 12 and the magnetic head 13. The magnetizing head 12 re-magnetizes MICR characters printed on the check, while the magnetic head 13 detects magnetism of the MICR characters re-magnetized by the magnetizing head 12.

A regeneration waveform is generated out of the MICR characters read out by the magnetic head 13 (Waveform generation process). Then, the generated MICR regeneration waveform is digitalized and saved in an MICR waveform memory (Regeneration waveform storage section). By using the MICR regeneration waveform data saved in the MICR waveform memory, magnetic ink character recognition processing is carried out in a microprocessor built in the magnetic character recognition apparatus 1. Details of the magnetic ink character recognition are explained in a section of (Magnetic character recognition method) described later.

In the present embodiment, the magnetic character recognition is carried out in the microprocessor built in the magnetic character recognition apparatus 1. However, the MICR regeneration waveform data may be transferred to a higher-level apparatus, in which the magnetic character recognition is carried out. Furthermore, a one-dimensional image pickup device of a close coupling type for reading an image on a surface of a check may be placed at either of an upper side and a lower side of the paper medium transfer path 11 or even at both the sides. Still further, a printing block for printing a prescribed matter on the surface of the check may also be placed.

Figure 2:
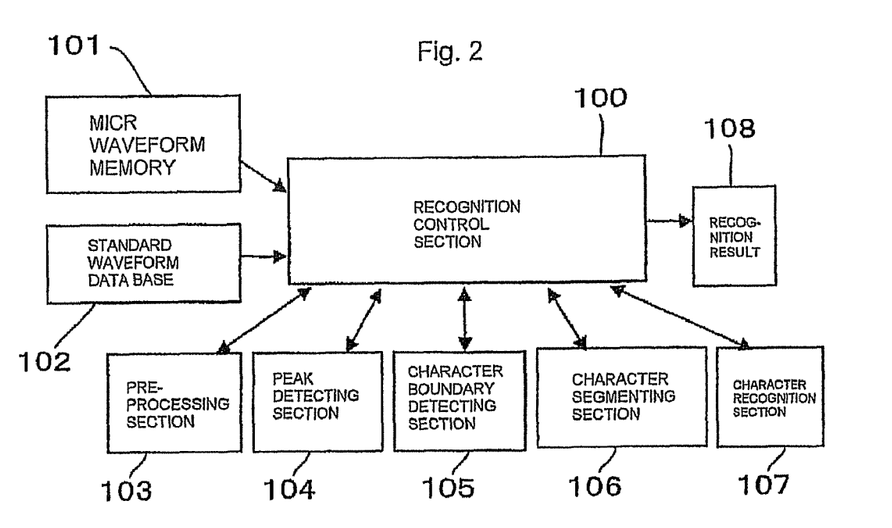
FIG. 2 is a block diagram showing an electrical configuration of the magnetic character recognition apparatus 1 in accordance with at least an embodiment of the present invention.

FIG. 2 is a block diagram showing an electrical configuration of the magnetic character recognition apparatus 1 in accordance with at least an embodiment of the present invention; illustrating a configuration of a section mainly relating to MICR processing.

In FIG. 2, the magnetic character recognition apparatus 1 includes a recognition control section 100, an MICR waveform memory 101, a standard waveform database 102, a preprocessing section 103, a peak detecting section 104, a character boundary detecting section 105, a character segmenting section 106, and a character recognition section 107. Then, the magnetic character recognition apparatus 1 displays a recognition result 108.

The MICR regeneration waveform saved in the MICR waveform memory 101 is processed at first in the preprocessing section 103 for removing noise from an entire part of the MICR regeneration waveform through smoothing, in order to generate a shaped waveform from which noise has already been removed. The preprocessing section 103 is just an example of a waveform generation section for generating a shaped waveform.

Subsequently, all peak information data included in the shaped MICR regeneration waveform are detected in the peak detecting section 104. Then, the peak information data such as a polarity (positive or negative), an intensity, a steeple position, and so on of each peak are saved. At the time, any peak provided with a peak intensity, which does not reach a predefined value, is excluded from the data.

Next, in accordance with the peak information data, a forefront peak of each magnetic ink character is detected from the MICR regeneration waveform in the character boundary detecting section 105. Then, in the character segmenting section 106, a character waveform corresponding to each character is segmented.

The character waveform segmented in the character segmenting section 106 is compared with each of waveforms stored in the standard waveform database 102 (Standard waveform storage section) for magnetic character recognition in the character recognition section 107.

A standard magnetic waveform for each MICR character is stored in the standard waveform database 102 (Standard waveform preparation process). Deformed-waveform data; corresponding to deformed characters of cases of a thick-lined or thin-lined MICR character, a tilted MICR character, and the like; are also stored as additional standard waveforms. If no character is uniquely assigned at an initial stage, comparison can be made with these additional standard waveforms.

Figure 3:
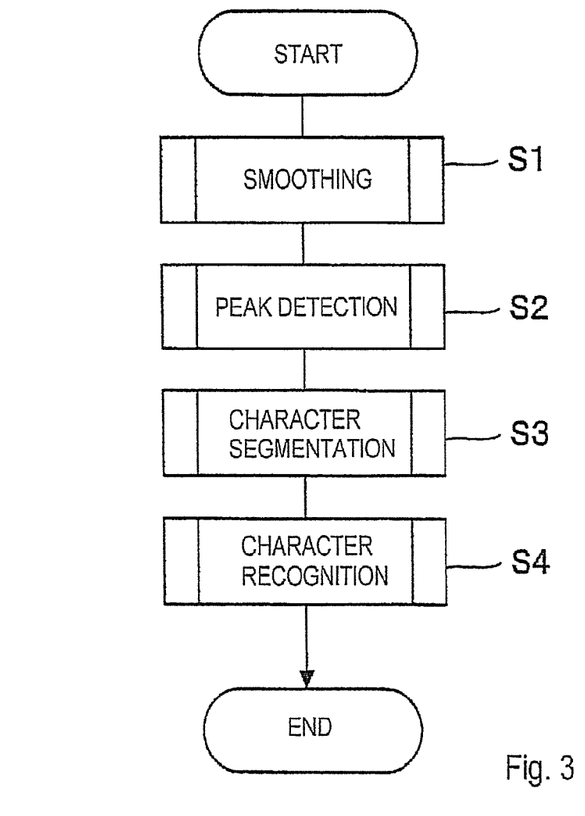
FIG. 3 is a flowchart showing a general workflow of the magnetic character recognition method in accordance with at least an embodiment of the present invention.

FIG. 3 is a flowchart showing a general workflow of a magnetic character recognition method in accordance with at least an embodiment of the present invention.

As shown in FIG. 3, smoothing operation is carried out at first in the magnetic character recognition method in accordance with the embodiment (Step S1). Specifically, an entire part of the MICR waveform is smoothed by means of a moving-average method and the like to remove high-frequency noise, so as to enable making a waveform comparison without bad influence by the noise.

Subsequently, peak detection is carried out (Step S2). Specifically, all peaks, namely all local maximum and minimum values, included in the MICR regeneration waveform are detected.

A positive peak is detected as an upward convex pattern. That is to say; where a signal output at the present point "t" is expressed as "Amp (t)" and a signal output at the next point is expressed as "Amp (t+1)", the difference between the two points is described as "Δ(t)=Amp (t+1)−Amp (t). Then, if "Δ(t)" is greater than 0 and "Δ(t+1)" is less than 0, it is determined that "Amp (t+1)" is a positive local maximum value. Meanwhile, a negative peak is detected as a downward convex pattern. That is to say; if "Δ(t)" is less than 0 and "Δ(t+1)" is greater than 0, it is determined that "Amp (t+1)" is a negative local maximum value (i.e., a local minimum value).

Such a positive peak and a negative peak appear alternately. Every time when a peak is detected; an index "t", an output value "Amp (t)", and a polarity "Sgn" of the peak are saved.

If one peak is formed with continuous output levels of the same value, the peak has a trapezoidal shape. In such a case, a beginning point and an end point of the flat peak part are calculated, and then a middle position between the two points is determined to be a peak point. Thus, a peak point can be detected accurately even when an MICR magnetic regeneration output of the check is saturated.

Furthermore, in a case where a signal output level does not reach a predefined value even though the signal output level has been determined to have a peak value, the signal is determined to be noise and it is not used. As a result, this makes it possible to carry out magnetic character recognition with high accuracy, being free from bad influence by the noise.

Subsequently, character segmentation is carried out (Step S3).

Figure 4:
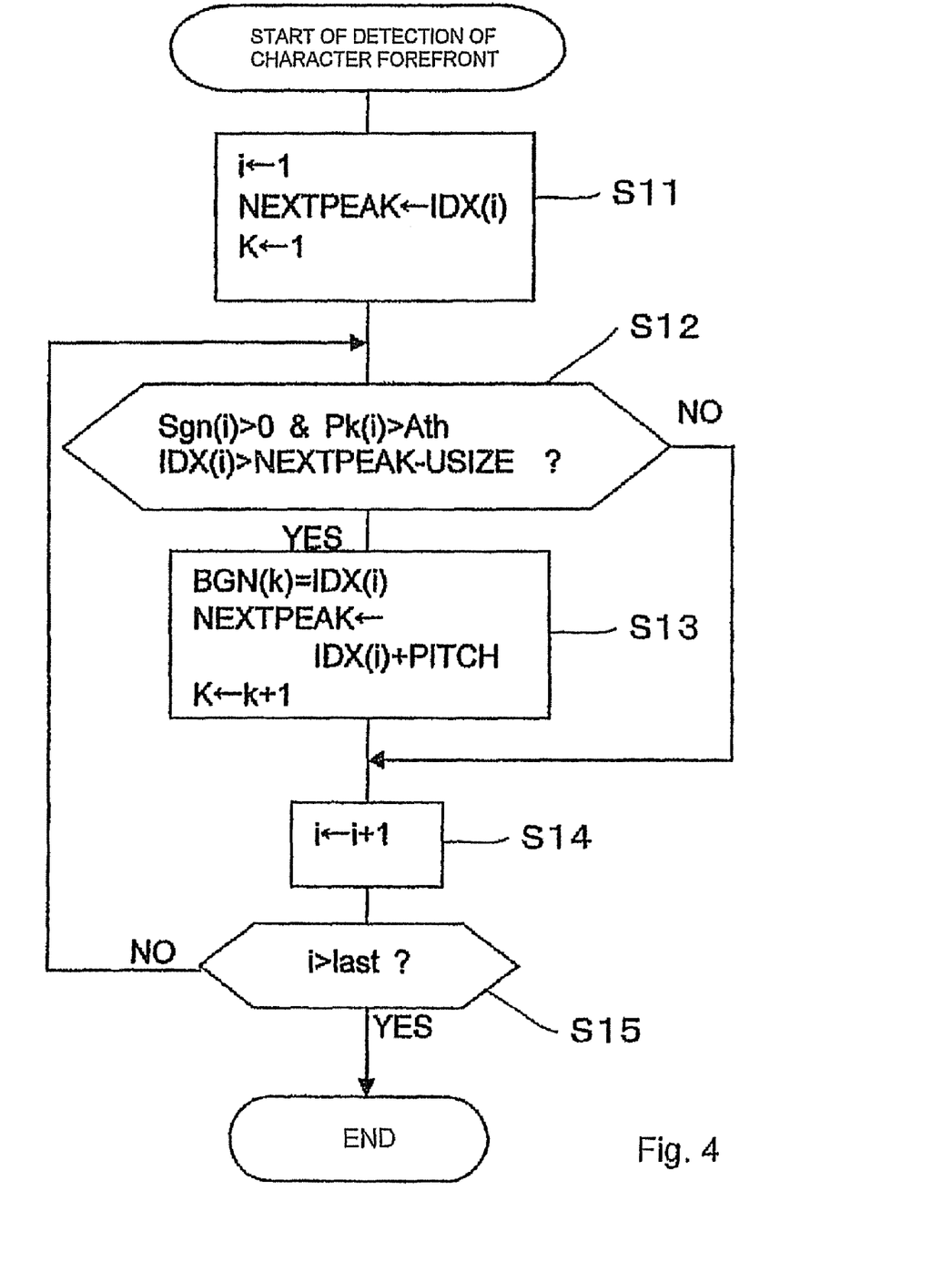
FIG. 4 is a flowchart showing a detailed workflow of the character segmentation described in the flowchart of FIG. 3
Figure 5:
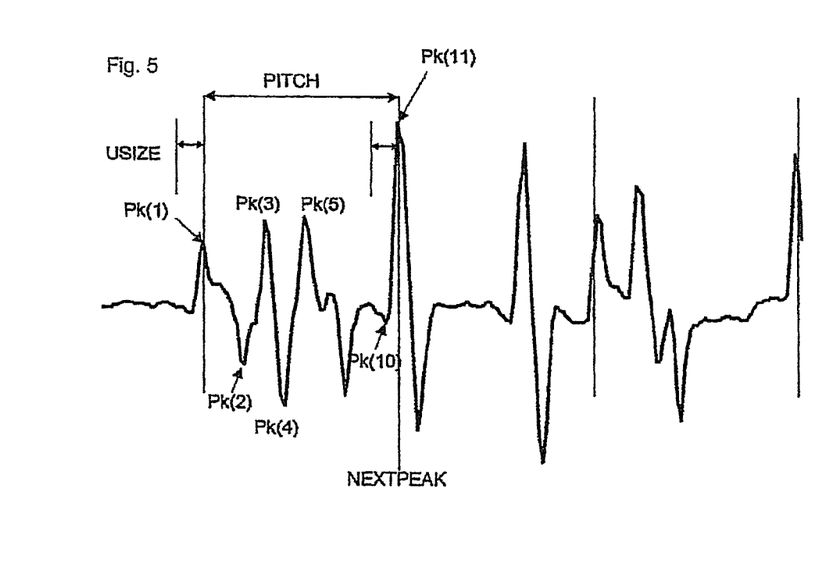
FIG. 5 illustrates an example of MICR regeneration waveform data.

FIG. 4 is a flowchart showing a detailed workflow of the character segmentation (Step S3) described in the flowchart of FIG. 3. Meanwhile, FIG. 5 illustrates an example of the MICR regeneration waveform data.

In the character segmentation (Magnetic ink character segmentation process), a forefront peak position of each character is detected at first. According to the standard specifications on MICR character printing, the forefront peak position of each character is defined to be a major peak having a positive polarity and an output value of a prescribed level or higher. Therefore, the MICR regeneration waveform is scanned from its beginning, and it is determined whether or not the level value at the peak "Pk" is a positive value being greater than a threshold "Ath". To specify the threshold "Ath", for example, an average of all positive peak values is calculated. Then, a 60% value of the average is set as the threshold "Ath".

In FIG. 4, "1" is substituted into the variables "i" and "k", and meanwhile a position index "IDX (i)", namely "IDX (1)", is substituted into "NEXTPEAK" (Step S11). When the level value "Pk (i)" is positive (The polarity function "Sgn (i)" is used to detect whether the value is positive or negative) and is greater than the threshold "Ath", it is determined whether or not the position index "IDX (i)" is greater than a value "NEXTPEAK-USIZE" (Step S12). If the position index is not greater than the value "NEXTPEAK-USIZE", it is determined that the position index "IDX (i)" at the time is not a character segmentation part. Then, after incrementing the variable "i" (Step S14), the operation returns to Step S12 and this cycle repeats until the variable "i" reaches "last".

On the contrary, if the position index "IDX (i)" is greater than the value "NEXTPEAK-USIZE" (i.e., the position index indicates a further advanced position than "NEXTPEAK-USIZE", and the level value "Pk (i)" is positive and greater than the threshold "Ath"), it is determined that the position index "IDX (i)" at the time is a character segmentation part. Then, the position index "IDX (i)" is substituted into "BGN (k)". Meanwhile, "IDX (i)+PITCH (Character interval)" is substituted into "NEXTPEAK" and the variable "k" is incremented for 1. Thus, the position index "IDX (1)" at "Pk (1)" shown in FIG. 5 is substituted into "BGN (1)", and the position index "IDX (11)" at "Pk (11)" shown in FIG. 5 is substituted into "BGN (2)". The same operation is repeated for "BGN (3)" and later.

Thus, detecting a forefront peak position of each character is repeated. At the time of exceeding an end of the MICR character waveform (Step S15: YES), the character segmentation quits.

"USIZE" described above indicates how many points shall exist before the forefront peak for the character waveform segmentation. In other words, standard waveform data are created in such a manner that a first peak is placed at a position of "USIZE-th" from the beginning. Therefore, a segmentation start point is to be placed at a position of "USIZE-th" before the forefront peak, and then a waveform having the same length as the length of the standard waveform is segmented.

Subsequently, character recognition is carried out (Step S4 in FIG. 3).

Figure 6:
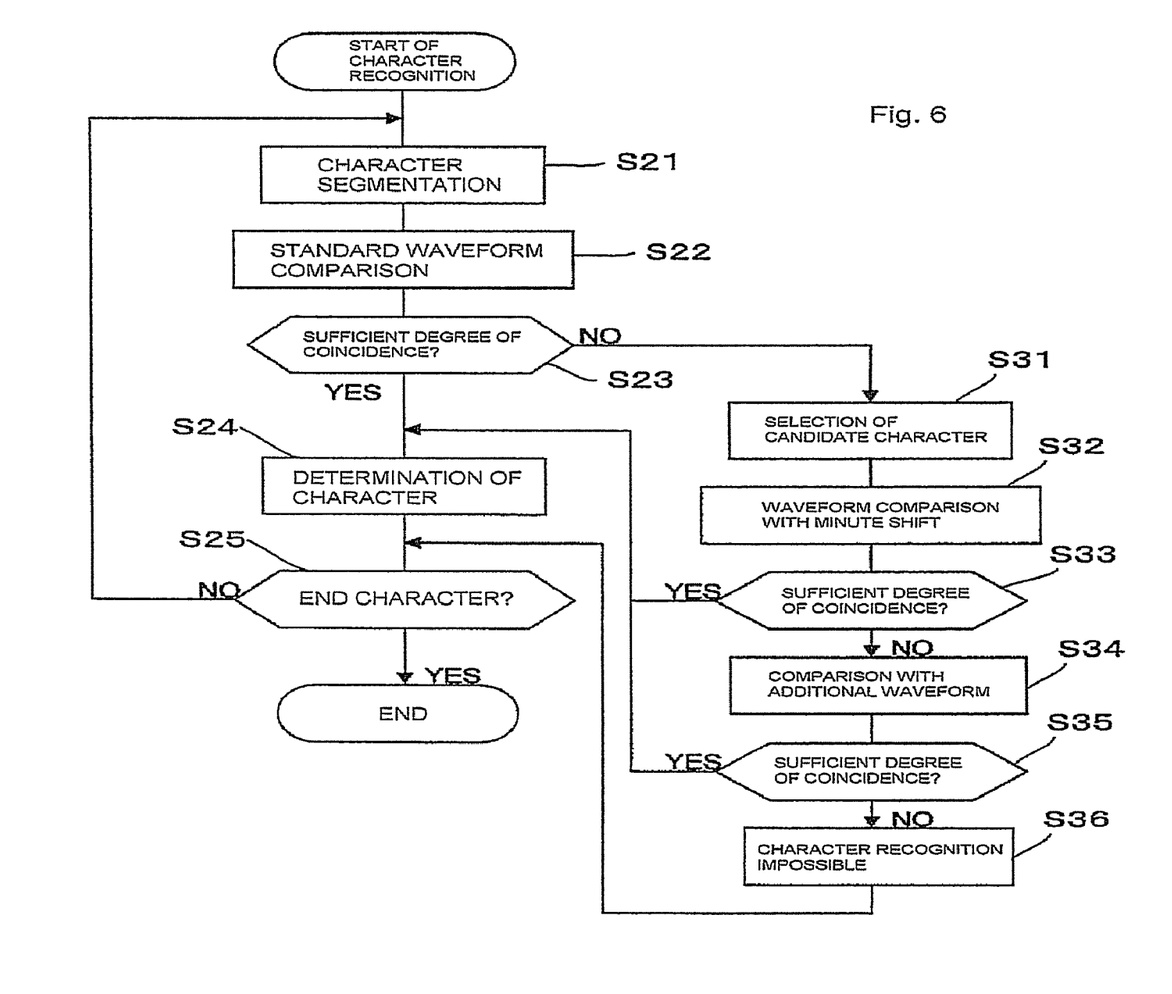
FIG. 6 is a flowchart showing a detailed workflow of the character recognition described in the flowchart of FIG. 3.

FIG. 6 is a flowchart showing a detailed workflow of the character recognition (Step S4) described in the flowchart of FIG. 3.

An MICR character waveform segmented through character segmentation (Step S21) is compared with a standard waveform through a standard waveform comparison process (Step S22). As a scale for a degree of coincidence (Coefficient of coincidence), normalized correlation is applied. If required, a sum of absolute differences may also be applied.

Figure 7:
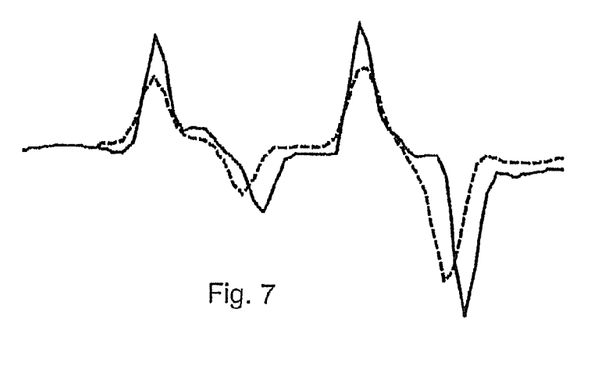
FIG. 7 shows an example of MICR character waveforms segmented by character segmentation.
Figure 8:
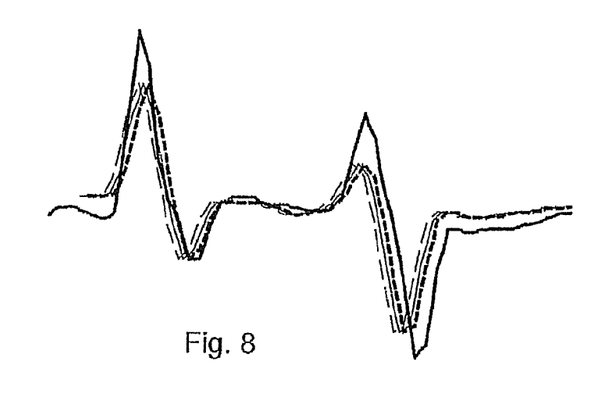
FIG. 8 shows an example of MICR character waveforms segmented by character segmentation.

FIG. 7 and FIG. 8 show examples of MICR character waveforms segmented by character segmentation.

In FIG. 7, the solid line and broken line show a segmented waveform of an MICR character "4" and a standard waveform of a character "4" that has shown the highest degree of coincidence, respectively.

In the character recognition process; if a standard waveform indicates the highest degree of coincidence among all the standard waveforms and the character recognition brings about a degree of coincidence exceeding the judgment threshold (i.e., the prescribed coefficient of coincidence) (Step S23), it is determined that the objective character waveform segmented corresponds to the character of the standard waveform (Step S24). In the present example, the degree of coincidence is 0.742 and therefore it is determined that the character is "4" when the judgment threshold is defined to be 0.7.

In FIG. 8, the solid line and thin broken line show a segmented waveform of an MICR character "5" and a standard waveform of a character "5" that has shown the highest degree of coincidence, respectively. The degree of coincidence is 0.695 in this case, being less than the judgment threshold. Therefore, it cannot be determined that the character is "5".

Then, a waveform comparison with minute shift is carried out (Step S32). While a waveform segmentation point is shifted back and forth little by little from its initial position, the degree of coincidence is calculated (Shift process) at each position. If a correct point of coincidence exists within the shift range, a degree of coincidence higher than the initial degree of coincidence is obtained at the point (Step S33). The thin line in FIG. 8 shows a condition in which the waveform segmentation point has been shifted for one dot to the right from the initial position. Furthermore, the thick broken line in FIG. 8 shows a condition in which the waveform segmentation point has been shifted for another dot to the right from the one-dot-shifted position described above (i.e., shifted for two dots from the initial position). Then, under the condition with the thick broken line, the degree of coincidence is 0.875, exceeding the judgment threshold 0.7. Therefore, it is determined that the character is "5" (Step S24).

The method described above causes a problem if the highest degree of coincidence is given with an unsuitable standard waveform. The highest degree of coincidence given with such an unsuitable standard waveform is most likely still less than the judgment threshold, and the highest degree of coincidence does not exceed the judgment threshold even after the waveform comparison with minute shift. This makes character recognition impossible, and impairs character recognition performance.

To solve the problem described above, a candidate character selection (Selection process) is carried out for making the waveform comparison with minute shift; wherein a plurality of candidate characters are selected in accordance with a result of placing in order regarding the degrees of coincidence at the initial time (Step S31).

Figure 9:
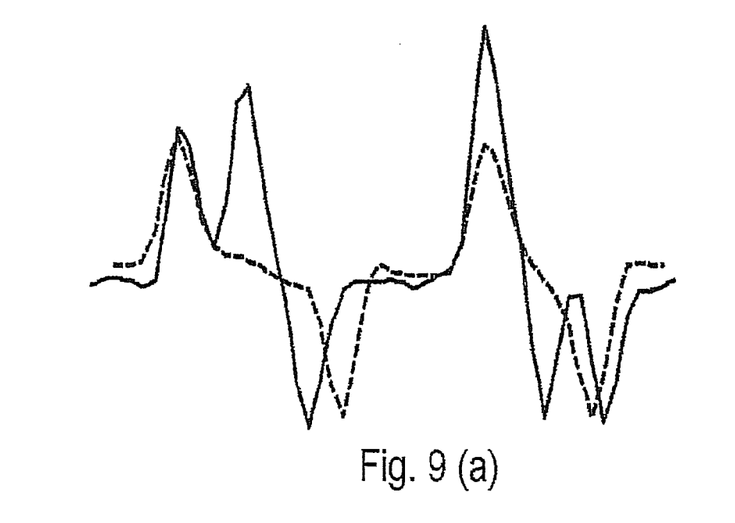
FIG. 9 shows an example of MICR character waveforms when an MICR character "8" is segmented.

FIGS. 9(a) and 9(b) shows an example of MICR character waveforms when an MICR character "8" is segmented. FIG. 9(a) illustrates a comparison of waveforms, and meanwhile FIG. 9(b) describes a table including the degree values of coincidence resulted from the waveform comparison with minute shift on 3 candidate characters that have been picked up as top three candidates as a result of the waveform comparison at the initial time. "+1" and "−1" in the table represent shifting the waveform segmenting position for one dot to the right and to the left, respectively.

In FIGS. 9(a) and 9(b), the highest degree of coincidence at the initial standard waveform position is given not by the standard waveform "8" but by the standard waveform "T" having just a little margin. However, any minute shift having the standard waveform "T" selected does not lead to a sufficiently high degree of coincidence so that the character recognition becomes impossible. On this occasion, the character "T" represents a transit symbol of "E-13B" of MICR, and no character "T" is actually printed on the surface of the check. The transit symbol can be changed according to specifications of the check and/or the objective apparatus, and there exist various kinds of specifications on the transit symbol.

The table of FIG. 9(b) shows 3 candidate characters for the waveform sample of FIG. 9(a) that have been picked up as top three candidates as a result of the waveform comparison at the initial time. At the initial position, the highest degree of coincidence is 0.685 and it does not reach the judgment threshold. Therefore, the segmenting position of the MICR character waveform is shifted for 3 dots each to the right and left (in the direction of generating a regeneration waveform and its counter direction) for carrying out a waveform comparison with minute shift. At this time, a degree of coincidence with the standard waveform of each candidate character is calculated at each shift position through an arithmetic operation process. In this example, the degree of coincidence with the standard waveform of the candidate character 2 shows the maximum value when the waveform position is shifted for 3 dots to the right, and the value exceeds the judgment threshold. As a result of the recognition, it is determined that the character is "8". This method does not need operation of the expansion and contraction of waveforms, having less operation load and reducing the operation time.

Furthermore, in a case where the degree of coincidence does not reach the judgment threshold even after the waveform comparison with minute shift, it mostly results from the printed magnetic character including an extremely thick or thin character line, or the printed magnetic character being tilted. For such a case, deformed-waveform data corresponding to deformed characters are prepared as additional standard waveforms besides the standard waveforms (Additional standard waveform preparation process). Then if the degree of coincidence does not get improved even after the waveform comparison with minute shift, comparison can be made with these additional standard waveforms (Step S34) so as to enable improvement of the degree of coincidence and securing sufficient reading performance.

Figure 10:
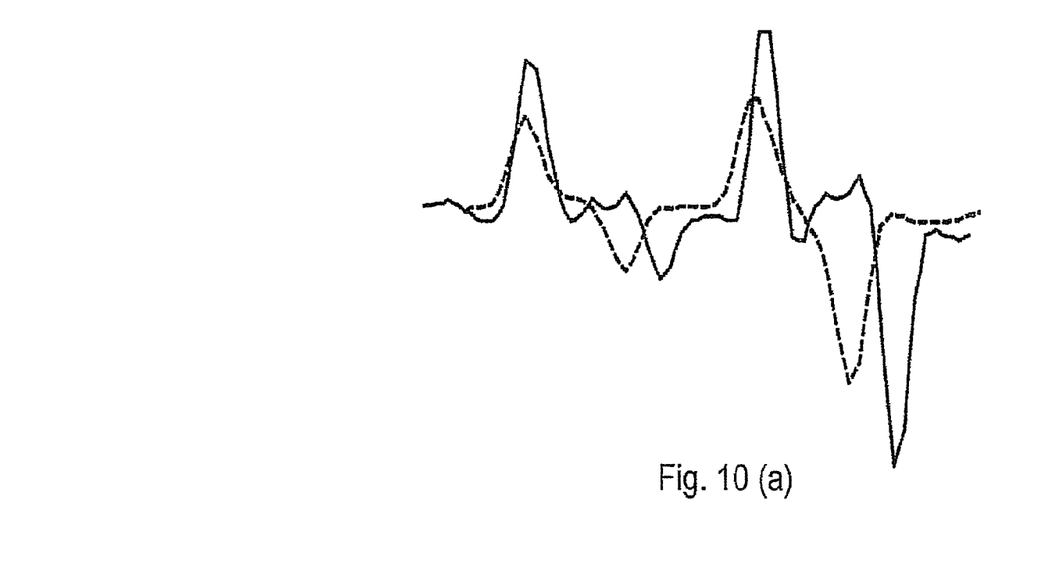
FIG. 10 shows an example of MICR character waveforms when an MICR character "4" is segmented.

FIGS. 10(a) and 10(b) shows an example of MICR character waveforms when an MICR character "4" is segmented. FIG. 10(a) illustrates a comparison of waveforms, and meanwhile FIG. 10(b) describes a table including the degree values of coincidence resulted from the waveform comparison with minute shift on 3 candidate characters that have been picked up as top three candidates in accordance with the result of the waveform comparison at the initial time.

In FIGS. 10(a) and 10(b), the waveform shown with a solid line is a segmented waveform of an MICR character "4", which is printed with a character line thicker than a standard one, resulting in a remarkable displacement between the segmented waveform and the broken-line standard waveform of a character "4". In this example, the selected candidate characters do not include the true character "4", and therefore any waveform comparison with minute shift does not improve the degree of coincidence, as FIG. 10(b) shows. If there is a margin of the processing capacity, an increase of the candidate characters may improve a chance that the candidate characters include the true character. However, the increase of the candidate characters causes a heavy operation load.

Figure 11:
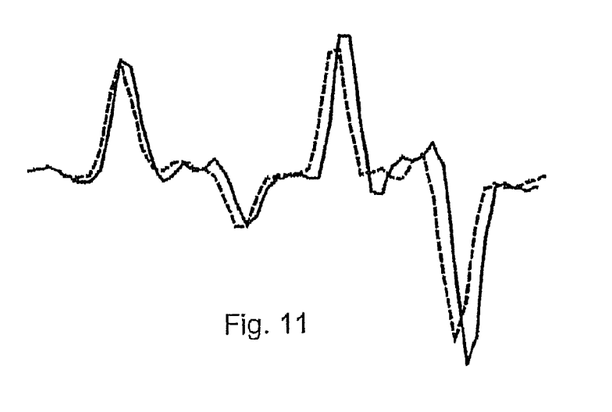
FIG. 11 shows an example of an additional standard waveform of an MICR character "4" printed with a thicker character line than a standard one.

Therefore, additional standard waveforms consisting of regeneration waveforms of characters printed with a thicker character line than a standard one are prepared beforehand. FIG. 11 shows an example of an additional standard waveform of an MICR character "4" printed with a thicker character line than a standard one. In the waveform comparison, using the additional standard waveform, shown by FIG. 11; the degree of coincidence of the waveforms of the MICR character is improved so as to be better than the result of the comparison using the standard waveform shown by FIGS. 10(a) and 10(b).

Thus, if the character recognition through the waveform comparison with minute shift (Step S32) has failed, the waveform comparison using the additional standard waveforms (Step S34) is carried out. Then, when the highest degree of coincidence exceeds the judgment threshold (Step S35), the character corresponding to the highest degree of coincidence is adopted as a result of the character recognition (Step S24). The additional standard waveforms may include those of various characters, such as characters with different character line thicknesses, tilted characters, and characters deformed due to high or low magnetic force; wherein the waveforms are corresponding to each deforming factor. While most significant deforming factors are selected, depending on tendencies of printed characters for the objective media and habits of the objective transfer mechanism; the additional standard waveforms corresponding to those deforming factors are prepared so that the character recognition can be carried out efficiently.

If the highest degree of coincidence does not exceed the judgment threshold even after the waveform comparison using the additional standard waveforms, it is determined that the character recognition is consequently impossible (Step S36). Then the operation proceeds to segmentation of a next character. Thus, having proceeded down to a last character (Step S25), the character recognition finishes.

The standards of MICR characters include E13-B and CNC-7. At least an embodiment of present invention can be applied to MICR characters of both the standards.

As described above, in accordance with the apparatus and method for magnetic ink character recognition relating to the present embodiment, MICR characters can be recognized with high accuracy even in a case where the character segmenting position is displaced, wherein a plurality of candidate characters are selected and the waveform comparison with minute shift is made by using each candidate character.

Furthermore, in a case where the character recognition through the waveform comparison with minute shift has failed, MICR characters can be recognized still with higher accuracy even when there exist variations in printing qualities and deformation of checks, and the like that result in a high level of waveform deformation; wherein the waveform comparison is made by using the additional standard waveforms of characters with different character line thicknesses, tilted characters, etc., corresponding to each deformation factor.

The standards of MICR characters include E13-B and CNC-7. At least an embodiment of the present invention can be applied to MICR characters of both the standards.

The method and apparatus for magnetic ink character recognition relating to at least an embodiment of the present invention are useful for enabling the character recognition with high accuracy even when there exist variations in printing qualities and deformation of checks, and the like that result in a high level of waveform deformation.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A method for magnetic character recognition with an information recording medium having a character string of magnetic ink characters printed thereon, the method comprising:
    preparing a first standard waveform that is used as a datum in an operation of reading magnetic ink characters, printed with a magnetic ink, by using a magnetic head, the first standard waveform comprising a plurality of candidate character waveforms;
    preparing a second standard waveform, the second standard waveform comprising a plurality of candidate character waveforms that have at least one of the following properties: being thick-lined, being thin-lined, and being tilted when read by a magnetic head;
    generating a regeneration waveform from the character string printed on the information recording medium;
    segmenting a regeneration character waveform of a magnetic ink character from the regeneration waveform;
    comparing the regeneration character waveform with the first and second standard waveforms;
    selecting a plurality of candidate character waveforms from the first and second standard waveforms based on a comparison result of the comparing the regeneration character waveform with the first and second standard waveforms;
    shifting the plurality of candidate character waveforms and the regeneration character waveform relatively in a generating direction of the regeneration waveform and its counter direction at predefined intervals;
    calculating a coefficient of coincidence indicating a degree of coincidence between each of the plurality of candidate character waveforms and the regeneration character waveform at each shift position in the shift process; and
    identifying, as a read character, the character corresponding to the candidate character waveform having the greatest coefficient of coincidence.

2. The method for magnetic character recognition according to one of claim 1 wherein, if the coefficient of coincidence is greater than a predefined coefficient of coincidence, the read character is identified with the candidate character that shows the greatest value among all the coefficient values of coincidence.

3. The method for magnetic character recognition according to claim 2, wherein the predefined coefficient of coincidence is set to be 0.7.

4. The method for magnetic character recognition according to claim 1:
    wherein at least 3 of the standard waveforms corresponding to the candidate characters having the highest coefficient of coincidence and its followers are selected in the comparison process.

5. The method for magnetic character recognition according to claim 1:
    wherein a shifting range in the shift process is 3 dots each in the generating direction of the regeneration waveform and its counter direction.

6. An apparatus for magnetic character recognition with an information recording medium having a character string of magnetic ink characters printed thereon, the apparatus comprising:
    a standard waveform storage section for storing a first standard waveform comprising a magnetic waveform of each of magnetic ink characters, printed with a magnetic ink, and a second standard waveform comprising a magnetic wave waveform of magnetic ink characters that have at least one of the following properties: being thick-lined, being thin-lined, and being titled when read by a magnetic head;

a magnetic head for reading a regeneration waveform from the character string printed on the information recording medium;

a regeneration waveform storage section for storing the regeneration waveform;

a character segmenting section for segmenting a character waveform, corresponding to one of the magnetic ink characters printed on the recording medium, from the regeneration waveform stored in the regeneration waveform storage section; and a character recognition section for comparing the first and second standard waveforms with the character waveform; and the character recognition section further comprising:

candidate character selecting means for selecting a plurality of candidate waveforms from among the first and second standard waveforms;

calculating means for a calculation of a coefficient of coincidence to indicate a degree of coincidence between each of the candidate waveforms and the character waveform at each shift position, wherein the candidate waveforms and the character waveform are relatively shifted in a generating direction of the regeneration waveform and its counter direction at predefined intervals; and     determining means for identifying a read character as the candidate character that has the greatest value among all the coefficient values of coincidence in.

7. The apparatus for magnetic character recognition according to claim 6, further comprising a waveform generation section for generating a shaped waveform by removing noise from the regeneration waveform stored in the regeneration waveform storage section.

8. The apparatus for magnetic character recognition according to claim 6, further comprising a peak detecting section for detecting peak information data out of the shaped waveform generated by the waveform generation section.

9. The apparatus for magnetic character recognition according to claim 6, further comprising a character boundary detecting section for detecting a boundary of each of the magnetic ink characters in the regeneration waveform in accordance with the peak information data.

\* \* \* \* \*